United States Patent
Zhang et al.

(10) Patent No.: US 11,909,245 B2
(45) Date of Patent: Feb. 20, 2024

(54) BATTERY CHARGING METHOD AND APPARATUS, AND STORAGE MEDIUM

(71) Applicant: BEIJING XIAOMI MOBILE SOFTWARE CO., LTD., Beijing (CN)

(72) Inventors: Jinhu Zhang, Beijing (CN); Huan Dang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 525 days.

(21) Appl. No.: 17/332,980

(22) Filed: May 27, 2021

(65) Prior Publication Data

US 2022/0077708 A1 Mar. 10, 2022

(30) Foreign Application Priority Data

Sep. 7, 2020 (CN) .......................... 202010930878.0

(51) Int. Cl.
*H02J 7/00* (2006.01)

(52) U.S. Cl.
CPC ...... *H02J 7/007182* (2020.01); *H02J 7/0047* (2013.01); *H02J 7/00308* (2020.01); *H02J 7/00714* (2020.01)

(58) Field of Classification Search
CPC .............................................. H02J 7/007182
USPC ........................................................ 320/134
See application file for complete search history.

(56) References Cited

U.S. PATENT DOCUMENTS

| | | | | |
|---|---|---|---|---|
| 2009/0323242 | A1* | 12/2009 | Shibayama | H02H 3/093 361/93.6 |
| 2011/0267000 | A1* | 11/2011 | Horie | H02J 7/04 320/162 |
| 2016/0064962 | A1* | 3/2016 | Huang | H02J 7/0071 324/427 |
| 2017/0353042 | A1* | 12/2017 | Liu | H01M 10/4257 |

FOREIGN PATENT DOCUMENTS

| | | |
|---|---|---|
| CN | 105015360 B | 7/2017 |
| CN | 107332316 A | 11/2017 |
| EP | 3672016 A1 | 6/2020 |
| EP | 3675316 A1 | 7/2020 |

OTHER PUBLICATIONS

Extended European Search Report in Application No. 21176413, dated Nov. 4, 2021.

\* cited by examiner

*Primary Examiner* — Yalkew Fantu
(74) *Attorney, Agent, or Firm* — Syncoda LLC; Feng Ma

(57) ABSTRACT

A battery charging method includes: acquiring a current static voltage of a battery in a current charging stage, and determining the maximum charging current matching with the current static voltage, during staged charging of the battery; and charging the battery according to the maximum charging current. The charging speed can be guaranteed, and the overvoltage protection cannot be triggered during each charging stage, thereby preventing damages to battery cells.

11 Claims, 3 Drawing Sheets

BATTERY CHARGING METHOD AND APPARATUS, AND STORAGE MEDIUM

CROSS-REFERENCE TO RELATED APPLICATION

This application claims priority to Chinese Patent Application No. 202010930878.0 filed on Sep. 7, 2020, the disclosure of which is hereby incorporated by reference in its entirety.

BACKGROUND

Users are increasingly dependent on electronic devices, and have ever increasing demands for batter performance of the electronic devices. Large capacity, endurance and safety have become important factors for evaluating the battery performance. When rolling out new generations of electronic devices, manufacturers tend to make certain improvements to the batteries.

SUMMARY

The present disclosure generally relates to the field of charging technology, and more specifically, to a battery charging method and apparatus, and a storage medium.

According to a first aspect of the embodiments of the present disclosure, there is provided a battery charging method, including:

acquiring a current static voltage of a battery in a current charging stage, and determining the maximum charging current matching with the current static voltage, during staged charging of the battery; and charging the battery according to the maximum charging current.

In some embodiments, the determining the maximum charging current matching with the current static voltage includes:

determining the maximum charging current matching with the current static voltage according to a real-time static voltage and a real-time DC resistance of the battery, when the current static voltage is greater than or equal to a charging voltage threshold corresponding to the current charging stage.

In some embodiments, the determining the maximum charging current matching with the current static voltage according to a real-time static voltage and a real-time DC resistance of the battery includes:

acquiring the real-time DC resistance and the real-time static voltage of the battery in real-time; and determining the maximum charging current matching with the real-time DC resistance and matching with the real-time static voltage based on a corresponding relationship among the DC resistance, the static voltage, and the maximum charging current.

In some embodiments, the corresponding relationship among the DC resistance, the static voltage, and the maximum charging current is predetermined in the following manner:

determining the longest response time of a system after which an overvoltage protection is triggered in the current charging stage, during the staged charging of the battery with different maximum charging currents according to different voltages, in response to the static voltage of the battery being greater than or equal to the charging voltage threshold corresponding to the current charging stage, and detecting the DC resistance and the static voltage of the battery in real-time in the current charging stage; determining the maximum charging current matching with the DC resistance and matching with the static voltage based on the detected DC resistance and static voltage, wherein the maximum charging current matching with the DC resistance and matching with the static voltage satisfies a requirement of not triggering the overvoltage protection within the longest response time of the system; and creating and storing the corresponding relationship among the DC resistance, the static voltage, and the maximum charging current.

In some embodiments, the determining the maximum charging current matching with the DC resistance and matching with the static voltage based on the detected DC resistance and static voltage includes:

when a same DC resistance corresponds to a plurality of static voltages, determining the maximum charging current corresponding to each static voltage of the plurality of static voltages respectively.

In some embodiments, the determining the maximum charging current matching with the current static voltage includes:

when the current static voltage is less than a charging voltage threshold corresponding to the current charging stage, determining the maximum charging current allowed in the current charging stage as the maximum charging current matching with the current static voltage.

The charging the battery according to the maximum charging current includes: charging the battery according to the maximum charging current allowed in the current charging stage until the maximum charging voltage of the battery in the current stage.

According to a second aspect of the embodiments of the present disclosure, there is provided a battery charging apparatus, including:

a determining unit, configured to acquire a current static voltage of a battery in a current charging stage, and determine the maximum charging current matching with the current static voltage, during staged charging of the battery; and a charging unit, configured to charge the battery according to the maximum charging current.

In some embodiments, the determining unit is configured to determine the maximum charging current matching with the current static voltage in the following manner:

determining the maximum charging current matching with the current static voltage according to a real-time static voltage and a real-time DC resistance of the battery, when the current static voltage is greater than or equal to a charging voltage threshold corresponding to the current charging stage.

In some embodiments, the determining unit is configured to determine the maximum charging current matching with the current static voltage according to the real-time static voltage and the real-time DC resistance of the battery in the following manner:

acquiring the real-time DC resistance and the real-time static voltage of the battery in real-time; and determining the maximum charging current matching with the real-time DC resistance and matches the real-time static voltage based on a corresponding relationship among the DC resistance, the static voltage, and the maximum charging current.

In some embodiments, the determining unit is configured to pre-determine the corresponding relationship among the DC resistance, the static voltage, and the maximum charging current in the following manner:

determining the longest response time of a system that triggers an overvoltage protection in the current charging stage, during the staged charging of the battery with different maximum charging currents according to different voltages, in response to the static voltage of the battery being greater than or equal to the charging voltage threshold corresponding to the current charging stage, and detecting the DC resistance and the static voltage of the battery in real-time in the current charging stage; determining the maximum charging current matching with the DC resistance and matching with the static voltage based on the detected DC resistance and static voltage, wherein the maximum charging current matching with the DC resistance and matching with the static voltage satisfies a requirement of not triggering the overvoltage protection within the longest response time of the system; and creating and storing the corresponding relationship among the DC resistance, the static voltage, and the maximum charging current.

In some embodiments, the determining unit is configured to determine the maximum charging current matching with the DC resistance and matching with the static voltage based on the detected DC resistance and static voltage in the following manner: when a same DC resistance corresponds to a plurality of static voltages, determining the maximum charging current corresponding to each static voltage of the plurality of static voltages respectively.

In some embodiments, the determining unit is configured to determine the maximum charging current matching with the current static voltage in the following manner:

when the current static voltage is less than a charging voltage threshold corresponding to the current charging stage, determining the maximum charging current allowed in the current charging stage as the maximum charging current matching with the current static voltage.

The charging unit is configured to charge the battery according to the maximum charging current in the following manner:

charging the battery according to the maximum charging current allowed in the current charging stage until the maximum charging voltage of the battery in the current stage.

According to a third aspect of the embodiments of the present disclosure, there is provided a battery charging apparatus, including:

a processor; and memory for storing processor executable instructions;

wherein, the processor is configured to execute the battery charging method according to the first aspect or any implementation of the first aspect.

According to a forth aspect of the embodiments of the present disclosure, there is provided a non-transitory computer-readable storage medium, when instructions in the storage medium are executed by a processor of a mobile terminal, the mobile terminal is enabled to execute the battery charging method according to the first aspect or any implementation of the first aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the disclosure and, together with the description, serve to explain the principles of the disclosure.

DETAILED DESCRIPTION

To make the objectives, technical solutions, and advantages of the present application clearer, the description will be further made below in detail to implementations of the application with reference to the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

At present, when charging the electronic products, an increase in current will cause the battery overvoltage protection, which will directly cause damage to the battery cells, and even cause security incidents in severe cases.

In this regard, the existing solution is to prevent the battery overvoltage protection from being triggered by reducing the increase speed of the current or lowing the staged charging voltage, but it will reduce the charging speed of the battery.

The battery charging method provided in the present disclosure is applied to an application scenario of charging a battery of an electronic device such as a smart phone. High-power and large-current charging is a common scenario for battery charging of the electronic devices. In the high-power and large-current charging scenario, when the battery is charged with a large instantaneous current, the voltage increases very quickly and will exceed the battery protection voltage in a very short time, which causes unnecessary actions of the battery protection circuit and even irreversible damage to the battery cell.

In the related art, the existing methods such as slowing down the increase speed of the current or lowering the staged charging voltage are used to avoid triggering the overvoltage protection, but the charging speed of the electronic device will be reduced.

The embodiments of the present disclosure provide a battery charging method, when the battery is charged with a large current, the static voltage and the DC resistance of the battery are monitored and analyzed to match the maximum charging current of the static voltage of the battery for charging, which can meet the requirements of the battery for large-current charging and can avoid causing battery protection and damage to the cells. In this regard, the battery charging method provided by the present disclosure can not only ensure the charging speed of the device, but also avoid triggering the overvoltage protection.

Figure 1:
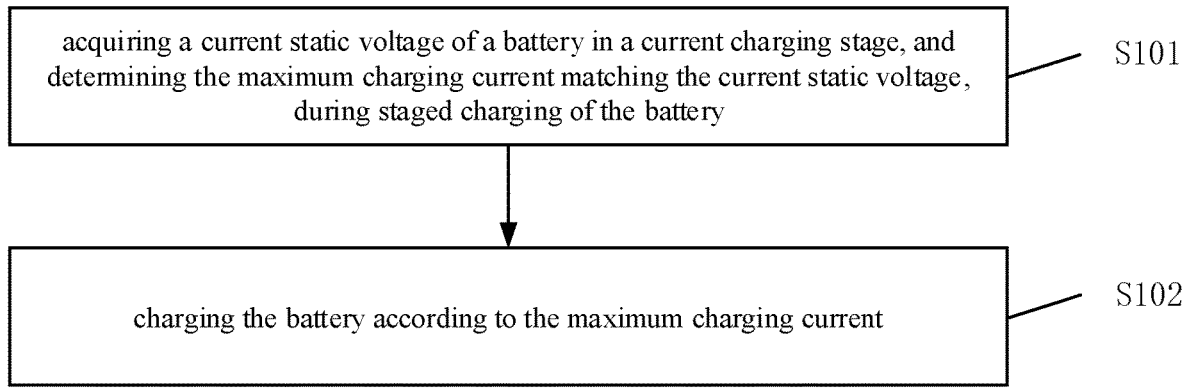
FIG. 1 is a flowchart showing a battery charging method according to some embodiments.

FIG. 1 is a flowchart showing a battery charging method according to some embodiments. As shown in FIG. 1, the battery charging method of the present disclosure can include the following steps S101 and S102.

In step S101, during staged charging of a battery, a current static voltage of the battery is acquired in a current charging stage, and the maximum charging current matching with the current static voltage is determined.

In the embodiment, when the device performs wired charging (or wireless charging), the battery is charged in stages. The current static voltage of the battery is acquired during the charging process, and the corresponding maximum charging current is acquired based on the current static voltage.

The static voltage refers to a voltage measured when the battery is in a state of not discharging or charging, and the static voltage of the battery acquired in the current charging stage is referred to as the current static voltage in the embodiment. The maximum charging current can be calculated and obtained in real-time based on the current static voltage and the DC resistance of the battery, or the maximum charging current corresponding to the current static voltage can be acquired by retrieving a pre-stored corresponding relationship between the static voltage and the maximum charging current.

The battery charging process can be divided into multiple charging stages based on the characteristics of the battery itself. When the battery is charged in different stages, there are different static voltages in the different stages, and the battery is charged with the maximum charging current matching with different statics, for example, if the maximum charging current corresponding to a static voltage in a first stage of the charging is $I_1$, the battery is charged with the maximum charging current $I_1$, and if the maximum charging current corresponding to a static voltage is $I_2$, the battery is charged with the maximum charging current $I_2$.

In step S102, the battery is charged according to the maximum charging current.

In some embodiments of the present disclosure, the battery is charged based on the determined maximum charging current, which can ensure that the overvoltage protection will not be triggered during the current charging stage and the charging is performed normally, and the battery is charged with the maximum charging current of the current stage, which ensures that the charging speed in the current stage will not drop.

As the charging progresses, the charging stage of the battery will change, and when the charging enters a next stage from the current stage, the battery will be charged with the maximum charging current matching with the current static voltage in the next stage, that is, the battery is charged with the maximum charging current matching with the current static voltage during the whole charging process to ensure the charging speed of the battery.

In the battery charging method provided by the embodiments of the present disclosure, during the staged charging of the battery, the current static voltage of the battery is acquired in the current charging stage, and the maximum charging current matching with the current static voltage is determined. The battery is charged according to the maximum charging current matching with the current static voltage, which can guarantee the charging speed, ensure that the overvoltage protection will not be triggered during each charging stage, and prevent the battery cell from being damaged.

In some embodiments of the present disclosure, the maximum charging current matching with the current static voltage can be determined based on a charging voltage threshold corresponding to the current charging stage. In an example, if the current static voltage is less than the charging voltage threshold corresponding to the current charging stage, the maximum charging current matching with the current static voltage can be the maximum charging current allowed in the current charging stage. In another example, if the current static voltage is greater than or equal to the charging voltage threshold corresponding to the current charging stage, the maximum charging current matching with the current static voltage can be the maximum charging current allowed at the current moment, which is calculated based on the static voltage, the DC resistance, and the like.

Figure 2:
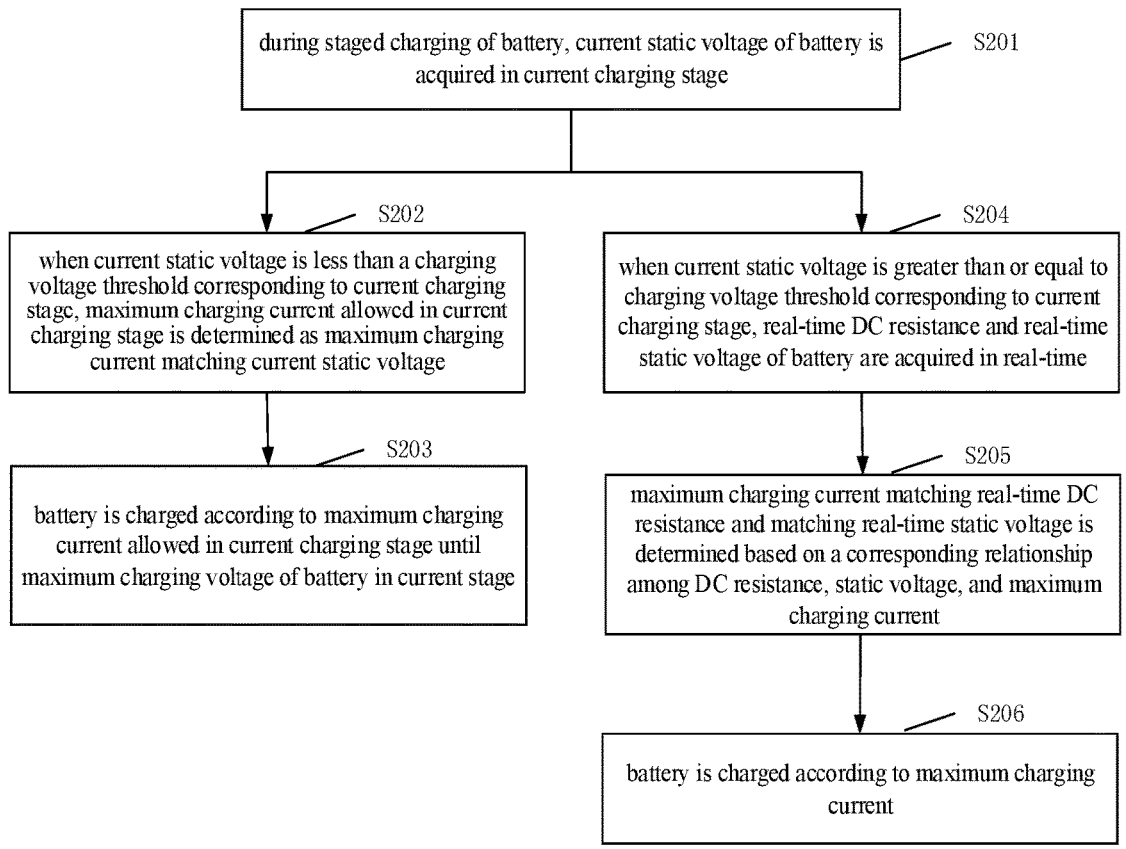
FIG. 2 is a flowchart showing a battery charging method according to some embodiments.

FIG. 2 is a flowchart showing a battery charging method according to some embodiments.

As shown in FIG. 2, the battery charging method of the present disclosure can include the following steps:

In step S201, during the staged charging of the battery, the current static voltage of the battery is acquired in the current charging stage.

The current static voltage of the battery in the current charging stage is detected and acquired in real-time during the charging process. The current charging stage can be any one charging stage of a plurality of stepped charging stages divided according to the battery attributes.

For details that are not explained in this step, please refer to S101, which will not be repeated here.

In step S202, when the current static voltage is less than a charging voltage threshold corresponding to the current charging stage, the maximum charging current allowed in the current charging stage is determined as the maximum charging current matching with the current static voltage.

In some embodiments of the present disclosure, the maximum charging current allowed in the current charging stage refers to the maximum charging current allowed in the current charging stage that is determined based on the properties of the battery itself When the acquired current static voltage is less than the charging voltage threshold corresponding to the current charging stage, it is indicated that the battery can continue to be charged with the maximum charging current allowed in this stage, the charging voltage threshold is the threshold value of the change of the charging current in this stage, and under the charging voltage threshold, charging with the maximum allowable charging current at this stage will not trigger overvoltage protection, and when the current static voltage is larger than or equal to the charging voltage threshold corresponding to the current charging stage, the step S204 is executed.

Herein, in the staged charging process, each charging stage corresponds to the maximum charging current allowed in its stage, and on this basis, as the static voltage of the battery continues to increase, when the current static voltage in a certain stage has not reached the charging voltage threshold in the stage, the battery can continue to be charged with the maximum charging current allowed in this stage.

In an example, the maximum charging current allowed in each stage can be stored in the system in advance.

In step S203, the battery is charged according to the maximum charging current allowed in the current charging stage until the maximum charging voltage of the battery in the current stage.

In some embodiments of the present disclosure, the battery is charged based on the maximum charging current allowed in the current charging stage, and the charging speed is the fastest.

It should be noted that when the battery is charged according to the maximum charging current allowed in the current charging stage and the static voltage has reached the maximum charging voltage in this stage, within the longest response time of the system that triggers the overvoltage protection in the current charging stage, the charging will enter the next stage.

In some embodiments of the present disclosure, the time elapsed from the occurrence of a large current charging phenomenon to the overvoltage protection of the system is referred as a system response time. The longest response time of the system that triggers the overvoltage protection will work in each charging stage, that is, if the longest response time of the system is 5 s, the system has a response time of 5 s, when the charging is in the first stage, and the battery is charged with the maximum charging current allowed in this stage. When the charging has not entered the next stage after the system response time, the overvoltage protection will be triggered. If the charging enters a second stage within 5 s, the system will have another response time of 5 s when the battery is charged, in the second stage, with the maximum charging current allowed in this stage.

In step S204, when the current static voltage is greater than or equal to the charging voltage threshold corresponding to the current charging stage, the real-time DC resistance and the real-time static voltage of the battery are acquired in real-time.

In some embodiments of the present disclosure, when the battery is charged with the maximum charging current allowed in the current charging stage such that the static voltage of the battery is greater than or equal to the charging voltage threshold in this stage, the actual detection data of battery-relevant parameters is required to determine the maximum charging current allowed in the current time. Herein, the relevant parameters include the real-time DC resistance and the real-time static voltage currently acquired in real-time.

During the battery charging process, the resistance value will change due to the temperature of the battery itself, and the static voltages of the battery are different at different times, the corresponding maximum charging current can be accurately acquired based on the real-time DC resistance and the real-time static voltage acquired in real-time, thereby avoiding overvoltage protection caused by inaccurate acquisition of current results due to data errors.

In step S205, the maximum charging current matching with the real-time DC resistance and matching with the real-time static voltage is determined based on a corresponding relationship among the DC resistance, the static voltage, and the maximum charging current.

When the current static voltage is greater than or equal to the charging voltage threshold corresponding to the current charging stage, the maximum charging current that does not cause overvoltage protection is measured in advance through experiments, the corresponding relationship among the DC resistance, the static voltage, and the maximum charging current obtained based on the experiments is stored in the system in advance, and the corresponding relationship can be in the form of a table or a function. Based on the real-time DC resistance and the real-time static voltage acquired in real-time, the maximum charging current corresponding to both the real-time DC resistance and the real-time static voltage is searched from the corresponding relationship.

Under different DC resistances, different static voltages of the battery correspond to the maximum charging currents. Therefore, when searching in the corresponding relationships, the search result needs to match both the real-time DC resistance and the real-time static voltage.

In step S206, the battery is charged according to the maximum charging current.

The battery is charged based on the determined maximum charging current, which can ensure that the overvoltage protection will not be triggered during the current charging stage, to ensure that the charging is carried out normally, and charging with the maximum charging current in the current stage ensures that the charging speed in the current stage will not drop.

The battery charging method mentioned above will be described below in conjunction with examples in some embodiments of the disclosure. In an example, the longest response time of the system that triggers the overvoltage protection is assumed to be t, the charging process of the battery is divided into stages of $V_1, V_2 \ldots V_n$, and the maximum charging currents of these N charging stages are $I_1, I_2 \ldots I_n$, respectively. Among them, $I_1, I_2 \ldots I_n$ are the maximum charging currents, allowed in each charging stage, which are determined according to the characteristics of the battery itself It is assumed that the battery is in the first charging stage (that is, the $V_1$ stage) at present. The charging voltage threshold of the first charging stage is $V_z$. If the current real-time static voltage of the battery is $V_a$ ($V_a<V_1$), the battery will be charged, when $V_a<V_z$, with the maximum charging current $I_1$ allowed in the first charging stage. As the charging progresses, the voltage continually rises, and if the battery static voltage $V_a$ reaches the cut-off voltage $V_1$ of the first charging stage within the longest response time t of the system, the charging will enter the second charging stage, that is, the $V_2$ stage.

If the battery static voltage $V_a$ reaches the charging voltage threshold $V_z$ of the first charging stage within the longest response time t of the system, that is, when $V_z \leq V_a<V_1$, the maximum charging current $I_b$ at which the overvoltage protection is not triggered when the battery static voltage $V_a$ is greater than the threshold $V_z$ is calculated based on the DC resistance and the static voltage acquired in real-time, and the battery is charged with Ib.

By analogy, if the $V_1$ stage is divided in more detail, the stages will correspond to multiple maximum charging currents $I_1, I_b \ldots I_m$.

By analogy, each of the charging stages $V_2 \ldots V_n$ corresponds to multiple maximum charging currents, and the charging process is the same as that of the $V_1$ stage.

When the charging enters different stages, different maximum charging currents are used for charging to ensure the charging speed without triggering overvoltage protection, and the charging is safe and efficient.

In the battery charging method provided in the present embodiment, during staged charging of the battery, the current static voltage of the battery is acquired in the current charging stage firstly, and different maximum charging currents are adopted to perform charging based on a comparison result of the acquired current static voltage and the charging voltage threshold corresponding to the current charging stage. Specifically, if the current static voltage is less than the charging voltage threshold corresponding to the current charging stage, the battery is charged according to the maximum charging current allowed in the current charging stage; and if the current static voltage is greater than or equal to the charging voltage threshold corresponding to the current charging stage, it is required that the real-time DC resistance and the real-time static voltage of the battery are acquired in real-time, and the maximum charging current matched with the real-time data is determined based on a corresponding relationship among the DC resistance, the static voltage and the maximum charging current, to charge the battery with the matched maximum charging current.

When the battery is charged with the maximum charging current allowed in the current charging stage to reach the charging voltage threshold, in order not to cause overvoltage protection, the current maximum current that can ensure the safe charging is determined based on the real-time data of the DC resistance and the static voltage of the battery in the embodiment, and the charging is performed accordingly. It can be guaranteed to be charged with the maximum current under different charging conditions thereby the charging speed is ensured.

In some embodiments of the present disclosure, the process of determining the corresponding relationship among the DC resistance, the static voltage, and the maximum charging current will be described below.

Figure 3:
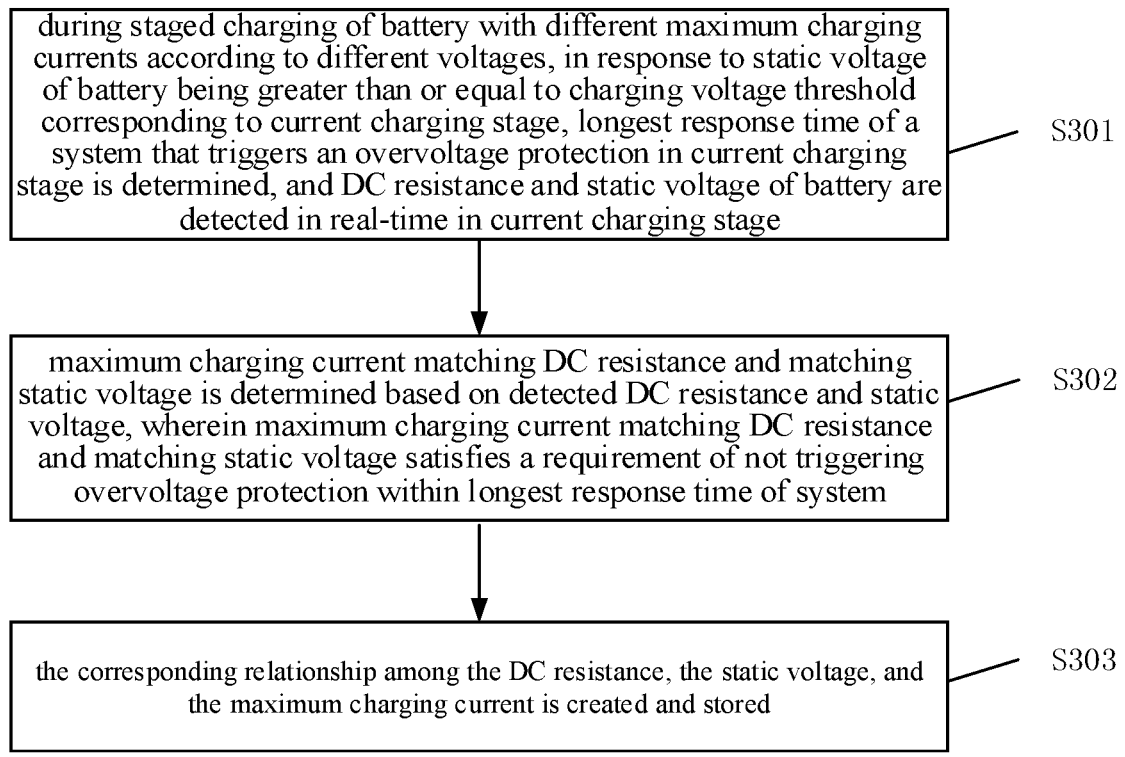
FIG. 3 is a flowchart showing a method for determining a corresponding relationship among a DC resistance, a static voltage, and the maximum charging current.

FIG. 3 is a flowchart showing a method for determining a corresponding relationship among a DC resistance, a static voltage, and the maximum charging current. As shown in FIG. 3, the method for determining the corresponding relationship among the DC resistance, the static voltage, and the maximum charging current of the present disclosure can include the following steps.

In step S301, during the staged charging of the battery with different maximum charging currents according to different voltages, in response to the static voltage of the battery being greater than or equal to the charging voltage threshold corresponding to the current charging stage, the longest response time of a system that triggers an overvoltage protection in the current charging stage is determined, and the DC resistance and the static voltage of the battery are detected in real-time in the current charging stage.

The battery is charged with the maximum charging current in stages, and the maximum charging current in each stage is different from each other. When the static voltage of the battery is less than the charging voltage threshold corresponding to the current charging stage, the battery is charged with the maximum charging current allowed in the stage determined based on the characteristics of the battery itself. As the charging progresses, the static voltage increases; if the battery is charged with the maximum charging current allowed in the stage when the longest response time of the system is over, the overvoltage protection is triggered; and when the response time has not been reached and the static voltage of the battery is greater than or equal to the charging voltage threshold corresponding to the stage, the system detects the DC resistance and the static voltage of the battery in real-time.

In step S302, the maximum charging current matching with the DC resistance and matching with the static voltage is determined based on the detected DC resistance and static voltage, wherein the maximum charging current matching with the DC resistance and matching with the static voltage satisfies a requirement of not triggering the overvoltage protection within the longest response time of the system.

Through the detected DC resistance and static voltage, the maximum charging current that can be carried when the static voltage of the battery is greater than or equal to the charging voltage threshold of the current charging stage is calculated. The maximum current is a maximum safe current that does not trigger the overvoltage protection after the static voltage exceeds the voltage threshold.

Based on steps S301 and S302, at least two maximum charging currents corresponding to the current charging stage can be obtained.

In step S303, the corresponding relationship among the DC resistance, the static voltage, and the maximum charging current is created and stored.

Based on the same steps as those of the current charging stage, at least two corresponding maximum charging currents can also be obtained for the remaining charging stages in the battery charging process.

The corresponding relationship is established according to the DC resistance, the static voltage and the maximum charging current of the battery in each charging stage, and the form of the corresponding relationship is not limited, and any form is possible as long as the corresponding relationship among the three can be indicated.

It should be particularly pointed out that because the DC resistance is affected by the temperature, the same DC resistance may correspond to multiple sets of static voltage and maximum charging current in the corresponding relationship, and thus, when using the corresponding relationship to search the maximum charging current, if the same DC resistance corresponds to multiple static voltages, the maximum charging current corresponding to each static voltage of the multiple static voltages should be determined respectively.

In some embodiments of the present disclosure, the following methods can be adopted in the process of charging the battery by applying the above-mentioned corresponding relationship among the DC resistance, the static voltage, and the maximum charging current.

During the staged charging of the battery, the current static voltage of the battery is acquired in the current charging stage. If the current static voltage is greater than or equal to the charging voltage threshold corresponding to the current charging stage, the real-time DC resistance and the real-time static voltage of the battery are acquired in real-time. Based on the corresponding relationship among the DC resistance, the static voltage, and the maximum charging current, the maximum charging current matching with the real-time DC resistance and matching with the real-time static voltage is determined.

When the current static voltage is greater than or equal to the charging voltage threshold corresponding to the current charging stage, the maximum charging current that does not cause overvoltage protection is measured through experiments performed in advance, the corresponding relationship among the DC resistance, the static voltage, and the maximum charging current obtained based on the experiments is stored in the system in advance, and the corresponding relationship can be in the form of a table or a function. Based on the real-time DC resistance and the real-time static voltage acquired in real-time, the maximum charging current corresponding to both the real-time DC resistance and the real-time static voltage is searched from the corresponding relationship.

Under different DC resistances, each of different static voltages of the battery corresponds to a maximum charging current. Therefore, when searching in the corresponding relationships, the search result needs to match both the real-time DC resistance and the real-time static voltage. The battery is charged according to the maximum charging current that matches the current static voltage.

The battery is charged based on the determined maximum charging current such that it can be ensured that the overvoltage protection is not triggered during the current charging stage and the charging is carried out normally, and the charging with the maximum charging current in the current stage ensures that the charging speed in the current stage does not drop.

In the battery charging method provided in the embodiment, the step of establishing the corresponding relationship in advance includes: during the staged charging of the battery with different maximum charging currents according to different voltages, in response to the static voltage of the battery being greater than or equal to the charging voltage threshold corresponding to the current charging stage, determining the longest response time of a system that triggers an overvoltage protection in the current charging stage, and detecting the DC resistance and the static voltage of the battery in real-time in the current charging stage; determining the maximum charging current matching with the DC resistance and matching the static voltage based on the detected DC resistance and static voltage, wherein the maximum charging current matching with the DC resistance and matching with the static voltage satisfies a requirement of not triggering the overvoltage protection within the longest response time of the system; and creating and storing the corresponding relationship among the DC resistance, the static voltage, and the maximum charging current. The corresponding relationship is determined based on the real-time data in advance, which ensures that the battery is charged with an accurate maximum current in the subsequent actual charging process and reduces the possibility of false triggering of the overvoltage protection.

Based on a similar concept, in some embodiments of the present disclosure, a battery charging apparatus is also provided.

It can be understood that, in order to realize the above-mentioned functions, the battery charging apparatus provided in some embodiments of the present disclosure includes hardware structures and/or software modules corresponding to each function. In combination with the units and algorithm steps of the respective examples disclosed in some embodiments of the present disclosure, the embodiments of the present disclosure can be implemented in the form of hardware or a combination of hardware and computer software. Whether a function is executed by hardware or computer software-driven hardware depends on the specific application and design constraints of the technical solution. Those skilled in the art can use different methods for each specific application to implement the described functions, but such implementation should not be considered as going beyond the scope of the technical solutions of the embodiments of the present disclosure.

Figure 4:
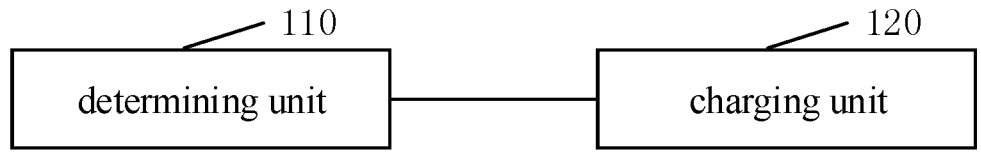
FIG. 4 is an apparatus block diagram showing a battery charging apparatus according to some embodiments.

FIG. 4 is a block diagram showing a battery charging apparatus according to some embodiments.

As shown in FIG. 4, a battery charging apparatus 100 includes a determining unit 110 and a charging unit 120.

The determining unit 110 is configured to acquire a current static voltage of a battery in a current charging stage, and determine the maximum charging current matching with the current static voltage, during staged charging of the battery.

The charging unit 120 is configured to charge the battery according to the maximum charging current.

In some embodiments, the determining unit 110 determines the maximum charging current matching with the current static voltage in the following manner:
when the current static voltage is greater than or equal to a charging voltage threshold corresponding to the current charging stage, determining the maximum charging current matching with the current static voltage based on a real-time static voltage and a real-time DC resistance of the battery.

In some embodiments, the determining unit 100 determines the maximum charging current matching with the current static voltage based on the real-time static voltage and the real-time DC resistance of the battery in the following manner:
acquiring the real-time DC resistance and the real-time static voltage of the battery in real-time; and
determining the maximum charging current matching with the real-time DC resistance and matching with the real-time static voltage based on a corresponding relationship among the DC resistance, the static voltage, and the maximum charging current.

In some embodiments, the determining unit 110 pre-determines the corresponding relationship among the DC resistance, the static voltage, and the maximum charging current in the following manner:
during the staged charging of the battery with different maximum charging currents according to different voltages, in response to the static voltage of the battery being greater than or equal to the charging voltage threshold corresponding to the current charging stage, determining the longest response time of a system that triggers an overvoltage protection in the current charging stage, and detecting the DC resistance and the static voltage of the battery in real-time in the current charging stage;
determining the maximum charging current matching with the DC resistance and matching with the static voltage based on the detected DC resistance and static voltage, wherein the maximum charging current matching with the DC resistance and matching with the static voltage satisfies a requirement of not triggering the overvoltage protection within the longest response time of the system; and
creating and storing the corresponding relationship among the DC resistance, the static voltage, and the maximum charging current.

In some embodiments, the determining unit 110 determines the maximum charging current matching with the DC resistance and matching with the static voltage based on the detected DC resistance and static voltage in the following manner:
when a same DC resistance corresponds to a plurality of static voltages, determining the maximum charging current corresponding to each static voltage of the plurality of static voltages respectively.

In some embodiments, the determining unit 110 determines the maximum charging current matching with the current static voltage in the following manner:
when the current static voltage is less than a charging voltage threshold corresponding to the current charging stage, determining the maximum charging current allowed in the current charging stage as the maximum charging current matching with the current static voltage; and
the charging unit is configured to charge the battery according to the maximum charging current in the following manner:
charging the battery according to the maximum charging current allowed in the current charging stage until the maximum charging voltage of the battery in the current stage.

With respect to the apparatus in the above embodiments, the specific implementations for performing operations by individual modules therein have been described in detail in some embodiments regarding the methods, which will not be elaborated herein.

Figure 5:
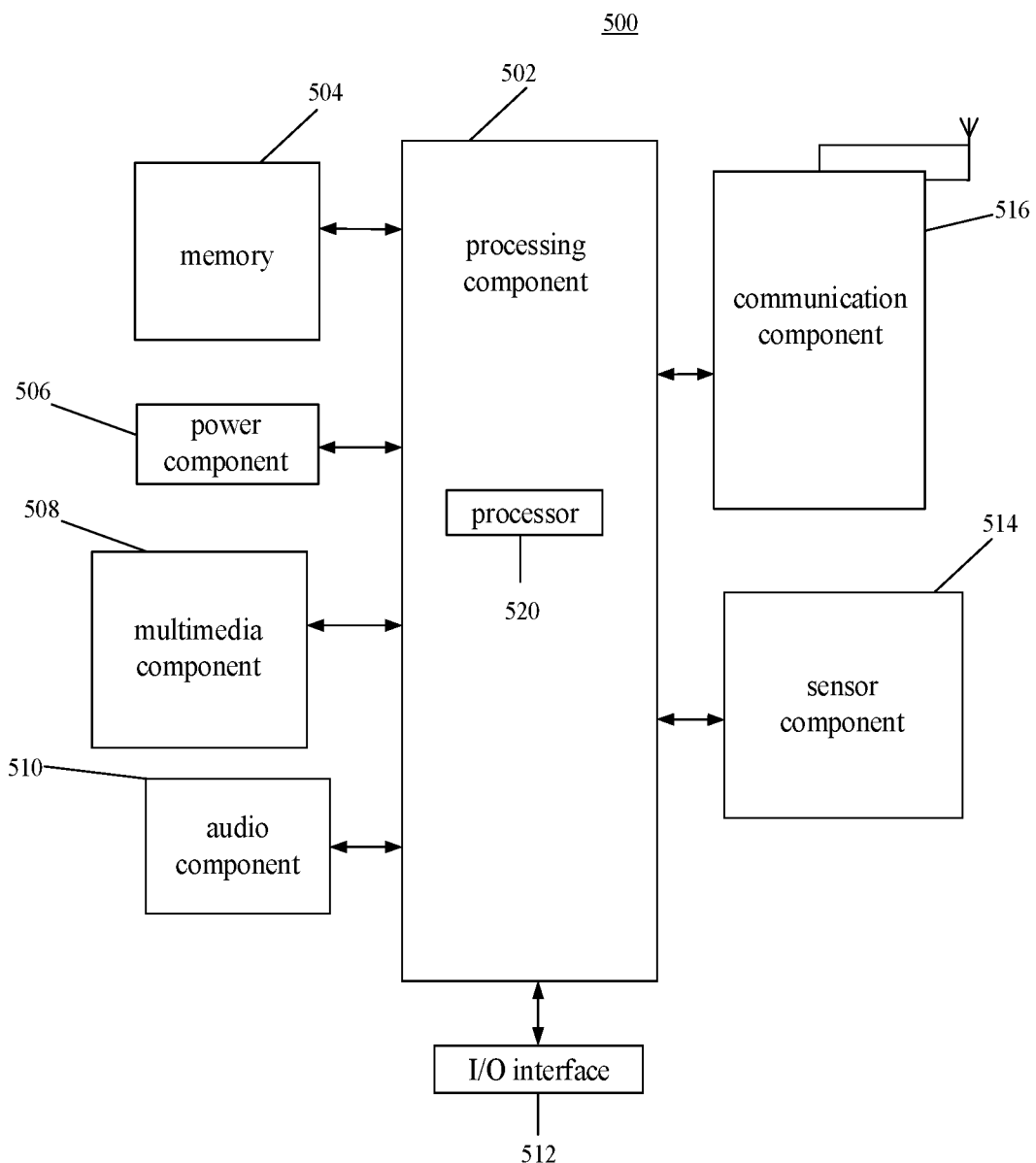
FIG. 5 is an apparatus block diagram showing a battery charging apparatus according to some embodiments.

FIG. 5 is a block diagram showing a battery charging apparatus according to some embodiments.

As shown in FIG. 5, the battery charging apparatus 500 can include one or more of the following components: a processing component 502, a memory 504, a power component 506, a multimedia component 508, an audio component 510, an input/output (I/O) interface 512, a sensor component 514, and a communication component 516.

The battery charging apparatus 500 can be a mobile phone, a computer, a digital broadcast terminal, a messaging device, a gaming console, a tablet, a medical device, exercise equipment, a personal digital assistant, and the like.

The processing component 502 typically controls overall operations of the battery charging apparatus 500, such as the operations associated with display, telephone calls, data communications, camera operations, and recording operations. The processing component 502 can include one or more processors 520 to execute instructions to perform all or part of the steps in the above described methods. Moreover, the processing component 502 can include one or more modules which facilitate the interaction between the processing component 502 and other components. For instance, the processing component 502 can include a multimedia module to facilitate the interaction between the multimedia component 508 and the processing component 502.

The memory 504 is configured to store various types of data to support the operation of the battery charging apparatus 500. Examples of such data include instructions for any applications or methods operated on the battery charging apparatus 500, contact data, phonebook data, messages, pictures, video, etc. The memory 504 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the battery charging apparatus 500. The power component 506 can include a power management system, one or more power sources, and any other components associated with the generation, management, and distribution of power in the battery charging apparatus 500.

The multimedia component 508 includes a screen providing an output interface between the battery charging apparatus 500 and the user. In some embodiments, the screen can include a liquid crystal display (LCD) and a touch panel (TP). In some embodiments, an organic light-emitting diode (OLED) display can be adopted.

If the screen includes the touch panel, the screen can be implemented as a touch screen to receive input signals from the user. The touch panel includes one or more touch sensors to sense touches, swipes, and gestures on the touch panel. The touch sensors not only can sense a boundary of a touch or swipe action, but also can sense a period of time and a pressure associated with the touch or swipe action. In some embodiments, the multimedia component 508 includes a front camera and/or a rear camera. The front camera and/or the rear camera can receive an external multimedia datum while the battery charging apparatus 500 is in an operation mode, such as a photographing mode or a video mode. Each of the front camera and the rear camera can be a fixed optical lens system or have focus and optical zoom capability.

The audio component 510 is configured to output and/or input audio signals. For example, the audio component 510 includes a microphone (MIC) configured to receive an external audio signal when the battery charging apparatus 500 is in an operation mode, such as a call mode, a recording mode, and a voice recognition mode. The received audio signal can be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons can include, but are not limited to, a home button, a volume button, a starting button, and a locking button.

The sensor component 514 includes one or more sensors to provide status assessments of various aspects of the battery charging apparatus 500. For instance, the sensor component 514 can detect an open/closed status of the battery charging apparatus 500, relative positioning of components such as the display and the keypad, of the battery charging apparatus 500, a change in position of the battery charging apparatus 500 or a component of the battery charging apparatus 500, a presence or absence of user contact with the battery charging apparatus 500, an orientation or an acceleration/deceleration of the battery charging apparatus 500, and a change in temperature of the battery charging apparatus 500. The sensor component 514 can include a proximity sensor configured to detect the presence of nearby objects without any physical contact. The sensor component 514 can also include a light sensor, such as a CMOS or CCD image sensor, for use in imaging applications. In some embodiments, the sensor component 514 can also include an accelerometer sensor, a gyroscope sensor, a magnetic sensor, a pressure sensor, or a temperature sensor.

The communication component 516 is configured to facilitate wired or wireless communication between the battery charging apparatus 500 and other devices. The battery charging apparatus 500 can access a wireless network based on a communication standard, such as Wi-Fi, 2G, 3G, 4G or 5G, or a combination thereof. In some embodiments, the communication component 516 receives a broadcast signal or broadcast associated information from an external broadcast management system via a broadcast channel. In some embodiments, the communication component 516 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the battery charging apparatus 500 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method according to any one of the above described embodiments.

In some embodiments, there is also provided a non-transitory computer-readable storage medium including instructions, such as the memory 504 including instructions, executable by the processor 520 in the battery charging apparatus 500, for performing the above-described methods.

The non-transitory computer-readable storage medium can be a ROM, a random access memory (RAM), a CD-ROM, a magnetic tape, a floppy disc, an optical data storage device, and the like.

Various embodiments of the present disclosure can have one or more of the following advantages.

In the battery charging method provided by the embodiments of the present disclosure, during the staged charging of the battery, a current static voltage of a battery is acquired in a current charging stage, and the maximum charging current matching with the current static voltage is determined. Charging the battery according to the maximum charging current matching with the current static voltage can guarantee the charging speed, and also ensure that the overvoltage protection will not be triggered during each charging stage, thereby preventing the battery cell from being damaged.

In the description of the disclosure, it is to be understood that the terms such as "first" and "second" and the like are for purposes of description only, and cannot be understood as indicating or implying the relative importance. The specific meanings of the above terms in the present application can be understood according to the specific situation for one of ordinary skill in the art. Further, in the description of the application, the "multiple" means two or more, unless otherwise specified. "And/or" describes the relationship of the related objects, indicating that there may be three relationships, for example, A and/or B may indicate three cases: A exists alone, A and B exist simultaneously, and B exists alone. The character "/" generally indicates that the relationship between the contextually relevant objects is a "or" relationship.

It can be understood that, the singular forms, "a," "an," and "the" are intended to include the plural forms as well, unless the context clearly indicates otherwise.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms, and these phrases may be interchangeably used.

The various device components, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms In some embodiments of the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A battery charging method, comprising:
acquiring a current static voltage of a battery in a current charging stage, and determining the maximum charging current matching with the current static voltage, during staged charging of the battery; and
charging the battery according to the maximum charging current,
wherein the determining the maximum charging current matching with the current static voltage comprises:
determining the maximum charging current matching with the current static voltage according to a real-time static voltage and a real-time DC resistance of the battery, when the current static voltage is greater than or equal to a charging voltage threshold corresponding to the current charging stage;
acquiring the real-time DC resistance and the real-time static voltage of the battery in real-time;
determining the maximum charging current matching with the real-time DC resistance and matching with the real-time static voltage based on a corresponding relationship among the DC resistance, the static voltage, and the maximum charging current; and
the corresponding relationship among the DC resistance, the static voltage, and the maximum charging current is predetermined by:
determining the longest response time of a system that triggers an overvoltage protection in the current charging stage, during the staged charging of the battery with different maximum charging currents according to different voltages, in response to the static voltage of the battery being greater than or equal to the charging voltage threshold corresponding to the current charging stage, and detecting the DC resistance and the static voltage of the battery in real-time in the current charging stage;
determining the maximum charging current matching with the DC resistance and matching with the static voltage based on the detected DC resistance and static voltage, wherein the maximum charging current matching with the DC resistance and matching with the static voltage satisfies a requirement of not triggering the overvoltage protection within the longest response time of the system; and creating and storing the corresponding relationship among the DC resistance, the static voltage, and the maximum charging current.

2. The battery charging method according to claim 1, wherein the determining the maximum charging current matching with the DC resistance and matching with the static voltage based on the detected DC resistance and static voltage comprises:
when a same DC resistance corresponds to a plurality of static voltages, determining the maximum charging current corresponding to each static voltage of the plurality of static voltages respectively.

3. The battery charging method according to claim 1, wherein the determining the maximum charging current matching with the current static voltage comprises:
when the current static voltage is less than a charging voltage threshold corresponding to the current charging stage, determining the maximum charging current allowed in the current charging stage as the maximum charging current matching with the current static voltage; and
the charging the battery according to the maximum charging current comprises:
charging the battery according to the maximum charging current allowed in the current charging stage until the maximum charging voltage of the battery in the current stage.

4. A battery charging apparatus implementing the battery charging method according to claim 1, comprising:
a processor; and
memory for storing processor executable instructions;
wherein, the processor is configured to execute steps of the battery charging method.

5. A non-transitory computer-readable storage medium having stored thereon instructions for execution by a processor of a mobile terminal which is enabled to execute the battery charging method according to claim 1.

6. The non-transitory computer-readable storage medium according to claim 5, wherein the determining the maximum charging current matching with the DC resistance and matching with the static voltage based on the detected DC resistance and static voltage comprises:
when a same DC resistance corresponds to a plurality of static voltages, determining the maximum charging current corresponding to each static voltage of the plurality of static voltages respectively.

7. The non-transitory computer-readable storage medium according to claim 5, wherein the determining the maximum charging current matching with the current static voltage comprises:
when the current static voltage is less than a charging voltage threshold corresponding to the current charging stage, determining the maximum charging current allowed in the current charging stage as the maximum charging current matching with the current static voltage; and
the charging the battery according to the maximum charging current comprises:
charging the battery according to the maximum charging current allowed in the current charging stage until the maximum charging voltage of the battery in the current stage.

8. A battery charging device implementing the method of claim 1, wherein the battery charging device is configured to charge the battery according to the maximum charging current matching with the current static voltage to ensure a charging speed and that that overvoltage protection will not be triggered during each charging stage, thereby preventing battery damage.

9. A battery charging apparatus, comprising:
a determining circuit, configured to acquire a current static voltage of a battery in a current charging stage, and determine the maximum charging current matching with the current static voltage, during staged charging of the battery; and
a charging circuit, configured to charge the battery according to the maximum charging current,
wherein the determining circuit is configured to determine the maximum charging current matching with the current static voltage by:
determining the maximum charging current matching with the current static voltage according to a real-time static voltage and a real-time DC resistance of the battery, when the current static voltage is greater than or equal to a charging voltage threshold corresponding to the current charging stage;
acquiring the real-time DC resistance and the real-time static voltage of the battery in real-time;

determining the maximum charging current matching with the real-time DC resistance and matching the real-time static voltage based on a corresponding relationship among the DC resistance, the static voltage, and the maximum charging current;

determining the longest response time of a system that triggers an overvoltage protection in the current charging stage, during the staged charging of the battery with different maximum charging currents according to different voltages, in response to the static voltage of the battery being greater than or equal to the charging voltage threshold corresponding to the current charging stage, and detecting the DC resistance and the static voltage of the battery in real-time in the current charging stage;

determining the maximum charging current matching with the DC resistance and matching with the static voltage based on the detected DC resistance and static voltage, wherein the maximum charging current matching with the DC resistance and matching with the static voltage satisfies a requirement of not triggering the overvoltage protection within the longest response time of the system; and creating and storing the corresponding relationship among the DC resistance, the static voltage, and the maximum charging current.

10. The battery charging apparatus according to claim 9, wherein the determining circuit is configured to determine the maximum charging current matching with the DC resistance and matching with the static voltage based on the detected DC resistance and static voltage by:

when a same DC resistance corresponds to a plurality of static voltages, determining the maximum charging current corresponding to each static voltage of the plurality of static voltages respectively.

11. The battery charging apparatus according to claim 9, wherein the determining circuit is configured to determine the maximum charging current matching with the current static voltage in the following manner:

when the current static voltage is less than a charging voltage threshold corresponding to the current charging stage, determining the maximum charging current allowed in the current charging stage as the maximum charging current matching with the current static voltage; and the charging circuit is configured to charge the battery according to the maximum charging current by:

charging the battery according to the maximum charging current allowed in the current charging stage until the maximum charging voltage of the battery in the current stage.

* * * * *